BEST AVAILABLE COPY

SARAH L. READER, S. BEERY & W. READER.

Top-Prop Blocks.

No. 5,753. Reissued Feb. 3, 1874.

Fig. 1.

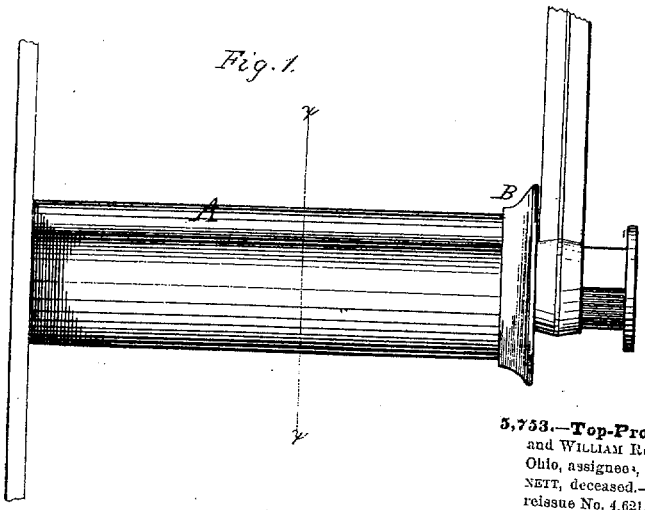

Fig. 2.

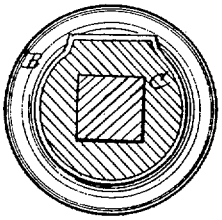

5,753.—Top-Prop Block.—SARAH L. READER, SIMON BEERY, and WILLIAM READER, guardian of VICLA BARNETT, Urbana, Ohio, assignees, by mesne assignments, of WILLIAM N. BARNETT, deceased.—Patent No. 52,126, dated January 23, 1866; reissue No. 4,621, dated November 7, 1871. Application filed December 17, 1873.

*Claim.*—1. A cylindrical carriage prop-block body, composed of india-rubber, substantially as described, constructed with a square hole longitudinally through the center thereof, to serve as a means of attachment, substantially as described.

2. A cylindrical carriage-prop-block body, composed of india-rubber, and having a projecting surface, to serve as a cushion, substantially as described.

3. A cylindrical carriage-prop-block body, composed of india-rubber, and having a projecting surface and projecting end pieces, substantially as described.

4. A cylindrical carriage-prop-block body, composed of india-rubber, in combination with the carriage-top prop-block iron, substantially as described.

5. A cylindrical carriage-prop-block body, composed of india-rubber, with a projecting surface, in combination with the carriage-top prop-block iron, substantially as described.

6. A cylindrical carriage-prop-block body, composed of india-rubber, with projecting end pieces, in combination with the carriage-top prop block iron, substantially as described.

7. A cylindrical carriage-prop-block body, composed of india-rubber, with a projecting surface and projecting end pieces, in combination with the carriage prop-block iron, substantially as described.

Sarah L. Reader
Simon Beery
Wm Reader
Guardian of Vicla Barnett

WITNESSES.
Griffith Ellis
Rob Ellis

AM. PHOTO-LITHOGRAPHIC CO. N.Y. (OSBORNE'S PROCESS.)

UNITED STATES PATENT OFFICE.

SARAH L. READER, SIMON BEERY, AND WILLIAM READER, GUARDIAN OF VIOLA BARNETT, OF URBANA, OHIO, ASSIGNEES, BY MESNE ASSIGNMENTS, OF WILLIAM N. BARNETT, DECEASED.

IMPROVEMENT IN TOP-PROP BLOCKS.

Specification forming part of Letters Patent No. 52,126, dated January 23, 1866; reissue No. 4,621, dated November 7, 1871; reissue No. 5,753, dated February 3, 1874; application filed December 17, 1873.

*To all whom it may concern:*

Be it known that WILLIAM N. BARNETT, late of the town of Urbana, in the county of Champaign and State of Ohio, now deceased, did invent certain new and useful Improvements in Carriage-Top Prop-Blocks; and we do hereby declare that the following is a full, clear, and exact description of the same.

Carriage-top prop-blocks have heretofore been made of a cylindrical form, of wood and leather, and the surface, against which the carriage-bow rests, being raised from the main body of the block, and also composed of leather, such prop-blocks were not durable. They also occasioned the back bow and other parts of the top to wear away rapidly.

This invention consists in a prop-block the characteristic features of which are mainly as follows: First, a cylindrical prop-block body, thus forming a continuous prop around the carriage-top prop-iron, and which is composed wholly of india-rubber, or equivalent elastic material; second, a surface projecting from the body of the prop-block, which acts as a raised elastic cushion and rest for the back bow.

The drawings show a prop-block which embodies the features of this invention; but it is not proposed to limit the invention to the form of parts therein shown.

Figure 1 is an exterior side view of the prop-block as applied in use. Fig. 2 is a cross-vertical section taken on the line *x x* of Fig. 1.

A shows the projecting surface upon the body of the prop-block. B is a projecting bead, which may be formed at each end, if desired, in order to give the prop-block a more ornamental and finished appearance, and which acts partially as a washer. C is a square hole made longitudinally through the center of the block, and by means of which the attachment to the carriage-iron of the block may be made in a secure manner. The whole prop-block is continuous about the carriage-iron; and, being composed of india-rubber, or its equivalent elastic material, the wearing of parts is greatly diminished.

We claim as the invention of WILLIAM N. BARNETT—

1. A cylindrical carriage-prop-block body, composed of india-rubber, substantially as described, constructed with a square hole longitudinally through the center thereof, to serve as a means of attachment, substantially as described.

2. A cylindrical carriage-prop-block body, composed of india-rubber, and having a projecting surface, to serve as a cushion, substantially as described.

3. A cylindrical carriage-prop-block body, composed of india-rubber, and having a projecting surface and projecting end pieces, substantially as described.

4. A cylindrical carriage-prop-block body, composed of india-rubber, in combination with the carriage-top prop-block iron, substantially as described.

5. A cylindrical carriage-prop-block body, composed of india-rubber, with a projecting surface, in combination with the carriage-top prop-block iron, substantially as described.

6. A cylindrical carriage-prop-block body, composed of india-rubber, with projecting end pieces, in combination with the carriage-top prop-block iron, substantially as described.

7. A cylindrical carriage-prop-block body, composed of india-rubber, with a projecting surface and projecting end pieces, in combination with the carriage-prop-block iron, substantially as described.

SARAH L. READER,
(*Formerly Sarah L. Barnett.*)
SIMON BEERY.
WM. READER,
*Guardian of Viola Barnett.*

Witnesses:
JAMES H. HUNTER,
K. NEWELL.